(12) United States Patent
Chung et al.

(10) Patent No.: US 10,793,363 B2
(45) Date of Patent: Oct. 6, 2020

(54) BELT CONVEYOR

(71) Applicant: S-MATERIAL HANDING CO., LTD., Changwon-si, Gyeongsangnam-do (KR)

(72) Inventors: Jang Young Chung, Changwon-si (KR); Jung Sup Song, Gimhae-si (KR)

(73) Assignee: S-MATERIAL HANDING CO., LTD., Changwon-si, Gyeongsangnam-Do (KR)

( * ) Notice: Subject to any disclaimer, the term of this patent is extended or adjusted under 35 U.S.C. 154(b) by 0 days.

(21) Appl. No.: 16/614,468

(22) PCT Filed: Sep. 10, 2018

(86) PCT No.: PCT/KR2018/010536
§ 371 (c)(1),
(2) Date: Nov. 18, 2019

(87) PCT Pub. No.: WO2019/093643
PCT Pub. Date: May 16, 2019

(65) Prior Publication Data
US 2020/0180867 A1   Jun. 11, 2020

(30) Foreign Application Priority Data

Nov. 10, 2017 (KR) .................. 10-2017-0149632

(51) Int. Cl.
| B65G 15/60 | (2006.01) |
| B65G 21/20 | (2006.01) |
| B65G 15/08 | (2006.01) |
| B65G 21/10 | (2006.01) |

(52) U.S. Cl.
CPC ............. *B65G 15/60* (2013.01); *B65G 15/08* (2013.01); *B65G 21/10* (2013.01); *B65G 21/2081* (2013.01); *B65G 2201/045* (2013.01); *B65G 2207/28* (2013.01); *B65G 2207/48* (2013.01); *B65G 2812/02138* (2013.01)

(58) Field of Classification Search
CPC .... B65G 15/60; B65G 15/62; B65G 2207/28; B65G 17/10; B65G 2201/045
USPC .................................................. 198/822, 823
See application file for complete search history.

(56) References Cited

U.S. PATENT DOCUMENTS

| 4,932,516 A | * | 6/1990 | Andersson | B65G 15/62 |
| | | | | 198/823 |
| 5,368,154 A | * | 11/1994 | Campbell | B65G 15/62 |
| | | | | 198/823 |
| 6,269,943 B1 | * | 8/2001 | Mott | B65G 15/08 |
| | | | | 198/823 |

(Continued)

FOREIGN PATENT DOCUMENTS

| JP | 2001-310811 A | 11/2001 |
| KR | 20-2009-0006062 U | 6/2009 |

(Continued)

*Primary Examiner* — James R Bidwell
(74) *Attorney, Agent, or Firm* — Novick, Kim & Lee, PLLC; Jae Youn Kim (57) ABSTRACT

A belt conveyor has a plurality of impact bars installed beneath a conveyor belt in transverse directions along a longitudinal direction of the belt in order to prevent the conveyor belt from sagging, and thus an operator can easily replace and check impact bars without stopping driving of the belt when replacing and checking the impact bars.

4 Claims, 8 Drawing Sheets

(56) References Cited

U.S. PATENT DOCUMENTS

| | | | | |
|---|---|---|---|---|
| 6,427,828 | B1* | 8/2002 | East | B65G 39/12 |
| | | | | 198/826 |
| 6,854,593 | B2* | 2/2005 | Boudreau | B65G 15/60 |
| | | | | 198/502.1 |
| 7,837,030 | B2* | 11/2010 | Daly | B65G 21/2081 |
| | | | | 198/861.1 |
| 8,408,385 | B2* | 4/2013 | Swinderman | B65G 21/02 |
| | | | | 198/860.1 |
| 8,770,391 | B2* | 7/2014 | Gibbs | B65G 15/08 |
| | | | | 198/823 |
| 9,714,141 | B2* | 7/2017 | Felton | B65G 21/2081 |
| 2004/0079621 | A1* | 4/2004 | Mott | B65G 39/12 |
| | | | | 198/823 |
| 2014/0061006 | A1* | 3/2014 | Gibbs | B65G 15/62 |
| | | | | 198/823 |
| 2014/0116850 | A1* | 5/2014 | Musick | B65G 43/00 |
| | | | | 198/617 |

FOREIGN PATENT DOCUMENTS

| | | |
|---|---|---|
| KR | 10-1555912 B1 | 9/2015 |
| KR | 10-1564369 B1 | 10/2015 |
| KR | 10-1680040 B1 | 11/2016 |

* cited by examiner

FIG. 8 nn# BELT CONVEYOR

TECHNICAL FIELD

The present invention relates to a belt conveyor, and more specifically to a belt conveyor in which a plurality of impact bar means which is installed beneath the conveyor belt in order to prevent a conveyor belt from sagging is installed in transverse directions along the longitudinal direction of the belt, and thus an operator can easily replace and check impact bars without stopping the driving of the belt when replacing and checking the impact bar means.

BACKGROUND ART

In general, a belt conveyor apparatus is an apparatus that transports products in one direction through a conveyor belt that rotates in a caterpillar manner. The objects that are carried by such conveyor belts include coal lumps, sand, cement, iron ore, coke, limestone, etc. In other words, a belt conveyor apparatus transports raw materials or the like over a short distance of several tens of meters in a short distance case or over a long distance of several kilometers in a long distance case. Such belt conveyor apparatuses are used as apparatuses that transfer raw minerals that are supplied in the form of granules or powders to a thermoelectric power plant handling a coal raw material, a cement manufacturing plant using limestone as raw material, a steel mill, a chemical plant, etc.

As an example, a conveyor belt for transporting bituminous coal, which is the fuel of a thermoelectric power plant, is mounted in an inverted trapezoidal shape on a supporting roller in order to prevent the transported bituminous coal from being moved zigzag and separated from the conveyor belt.

Conventional support rollers for supporting a conveyor belt that transports products, such as bituminous coal, are configured such that inclined idler rollers are disposed at both ends of a central idler roller and a belt is placed over the rollers, as proposed by Korean Utility Model Application No. 2007-0020142.

However, the above-described conventional conveyor belt has a problem in that a belt sagging phenomenon occurs between the side surface idler rollers 10 disposed on both sides of the center idler roller 10 which holds and supports a belt when products, such as bituminous coal, are transported using the belt and skirts configured to prevent dust, and thus the products, such as bituminous coal, are separated from the sagging belt or struck between the skirts.

Figure 1:
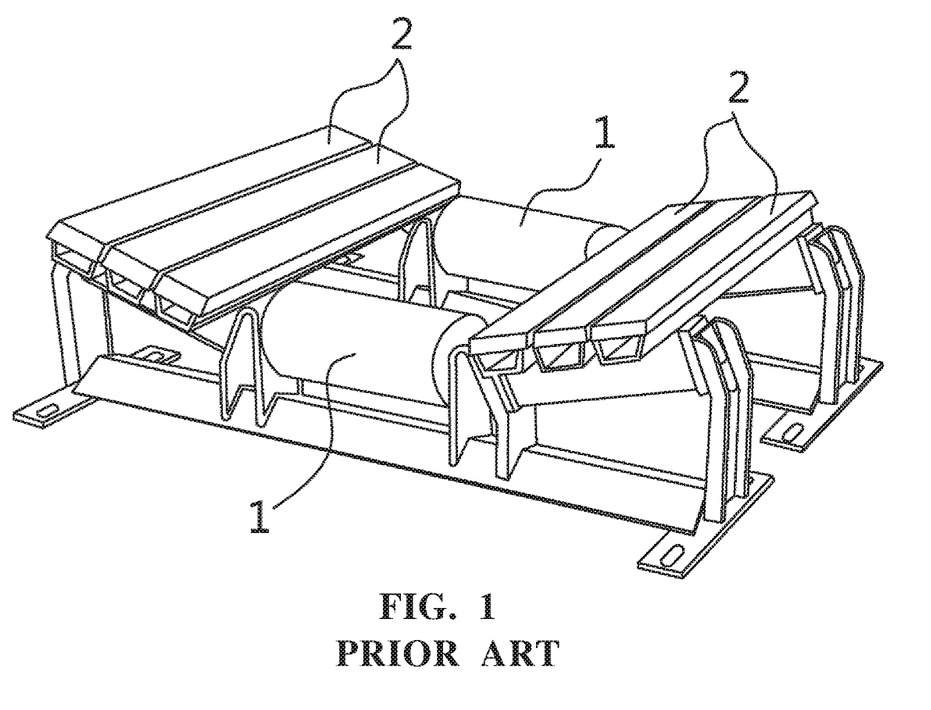
FIG. 1 is a perspective view showing a state in which impact bars are installed in a conventional belt conveyor.

Furthermore, as shown in FIG. 1, in the conventional art, impact bars 32 configured to hold and support a belt surface are installed in a vertical direction along the transfer direction of the belt. Due to the structure in which the impact bars 32 are installed in the vertical direction, when the impact bars 32 located adjacent to the center side of the belt are worn and damaged, the impact bars need to be separated and replaced sequentially from the outermost impact bar, and thus a problem arises in that an excessively long time is required to replace impact bars.

Furthermore, as the impact bars are installed in the vertical direction, the support area of the belt supported by an impact bar assembly is widely distributed, and thus the belt conveyor apparatus needs to be stopped when the impact bars are checked and replaced, with the result that a problem arises in that work efficiency is deteriorated.

DISCLOSURE

Technical Problem

Accordingly, the present invention has been conceived to overcome the above-described problems of the prior art, and an object of the present invention is to provide a belt conveyor in which a plurality of impact bar means which is installed beneath the conveyor belt in order to prevent a conveyor belt from sagging is installed in transverse directions along the longitudinal direction of the belt, and thus an operator can easily replace and check impact bars without stopping the driving of the belt when replacing and checking the impact bar means, and in which the impact bar means are detachably installed along a sliding rail, and thus it is easy to check and replace the impact bars.

Technical Solution

In order to accomplish the above object, according to an aspect of the present invention, the present invention provides a belt conveyor including: a belt which is formed in a belt shape, which is supported, rotated and moved by a plurality of rollers, and which moves ore and a product seated on the top thereof in one direction; skirt means which are installed along the longitudinal direction of the belt, which are installed on both sides over the belt, and which prevent the ore and the product from being scattered in the directions of both sides above the belt when the ore and product seated on the belt are transferred; impact bar means which are installed beneath both sides of the belt, and which nab against the belt and also support the bottom surface of the belt, thereby preventing the belt from sagging, when the belt is stopped and rotated and moved; and impact bar fastening means which are installed beneath the impact bar means, and which support the lower ends of the impact bar means, wherein the impact bar means which are installed beneath both sides of the belt are installed in transverse directions along the longitudinal direction of the belt, and the impact bar means which are installed over the impact bar fastening means are detachably installed in left-right directions.

Each of the impact bar means includes: an impact bar which has a rectangular plate shape, which is made of an engineering plastic material, and which supports the bottom surface of the belt; a wear check plate mounting groove which is formed on a corresponding one of both sides over the impact bar, and which is depressed to a predetermined depth; a wear check plate which is installed inside the wear check plate mounting groove, and which is formed in a color different from that of the impact bar and, thus, is exposed to the outside and indicates the replacement time of the impact bar when the impact bar has been worn by a predetermined amount or more; a sliding plate which is installed beneath the impact bar, which is composed of a plate having a predetermined thickness, and which supports the bottom of the impact bar; and a sliding guide frame which is installed on a corresponding one of both sides of a bottom surface of the sliding plate, which is composed of a steel frame having an inverted and reversed L-section shape, and which is installed along the bottom surface of the sliding plate in a front-rear direction and guides sliding when the impact bar is attached or detached.

Each of the impact bar fastening means includes: a sliding rail which has an inverted "U"-section shape, which is installed beneath the impact bar means, which is installed between the sliding guide frames, and which guides the impact bar fastening means through sliding; a first support frame which is fastened to one side of the sliding rail, and which supports one side of the sliding rail; and a second support frame which is fastened to the other side of the sliding rail, and which supports the other side of the sliding rail.

An attachment/detachment grip which is formed in a grip shape, which is fastened to the sliding plate and which allows a hand of an operator to grip it when the impact bar means is attached or detached is further provided on one side of the impact bar means.

A buffer member which is made of an elastic material and which elastically supports each of the impact bars is further provided beneath the impact bar; and buffer grooves which are depressed at predetermined intervals along a longitudinal direction and which increase elastic force upon supporting the bottom surface of the impact bar are further provided on the top surface of the buffer member.

Advantageous Effects

The belt conveyor according to the present invention has the following effects:

According to the present invention, an operator can easily detach only the impact bar means and then check the impact bars for their wear states during the operation of the belt conveyor, and thus an advantage arises in that the operation efficiency and assembly work efficiency of the belt conveyor are improved.

Furthermore, the impact bar means are installed in the transverse directions based on the longitudinal direction of the belt, and thus an effect arises in that this structure facilitates the checking and replacement of the impact bars located on the center side of the belt compared to the conventional structure in which the impact bars are installed in vertical directions.

Moreover, when an operator checks the impact bar means and then observes the wear check plate having a color different from that of the impact bars by the naked eye, the impact bar can be replaced, and thus advantages arise in that impact bar checking time is reduced and the efficiency of impact bar checking work is improved.

BEST MODE

Preferred embodiments of a belt conveyor according to the present invention will be described in detail below with reference to the accompanying drawings.

Figure 2:
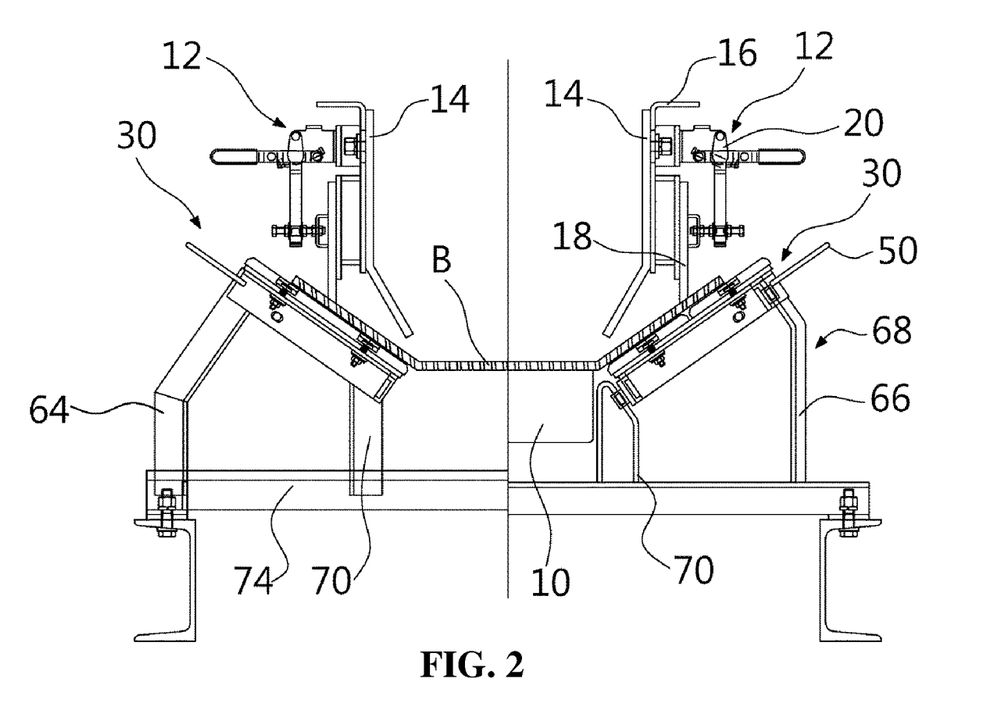
FIG. 2 is a front sectional view showing the configuration of a preferred embodiment of a belt conveyor according to the present invention.
Figure 3:
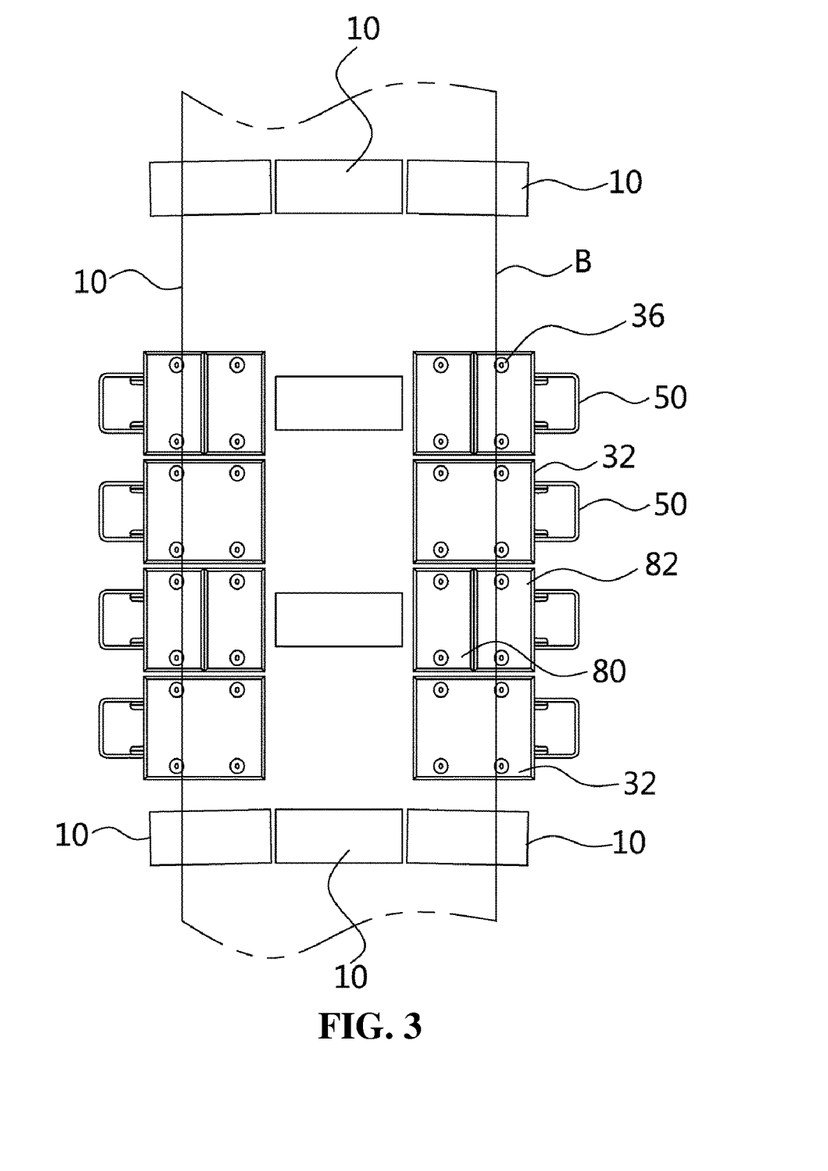
FIG. 3 is a plan view showing the configuration of the preferred embodiment of the belt conveyor according to the present invention.
Figure 4:
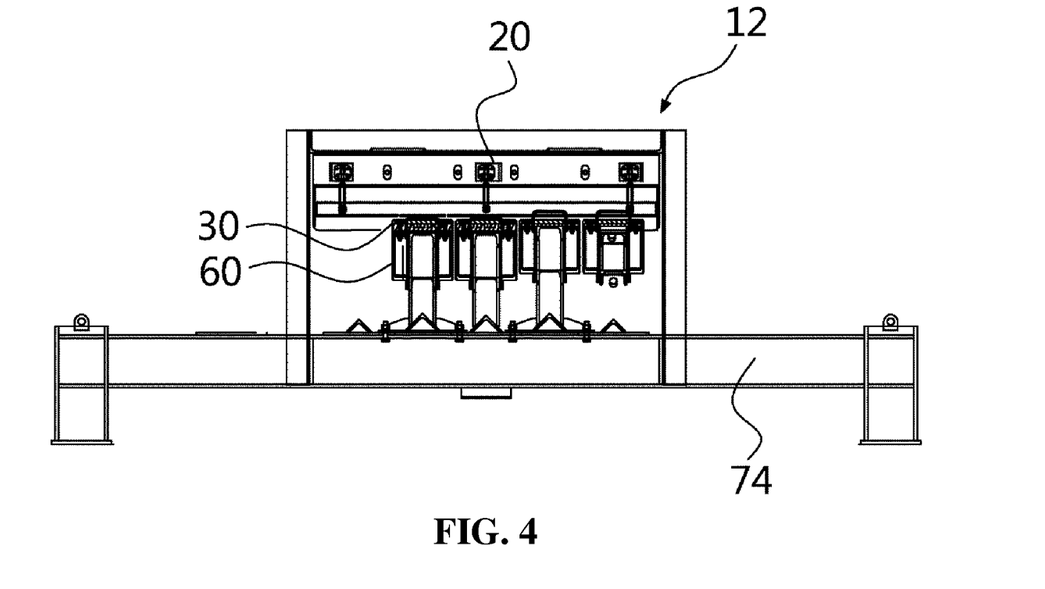
FIG. 4 is a side view showing the configuration of the preferred embodiment of the belt conveyor according to the present invention.
Figure 5:
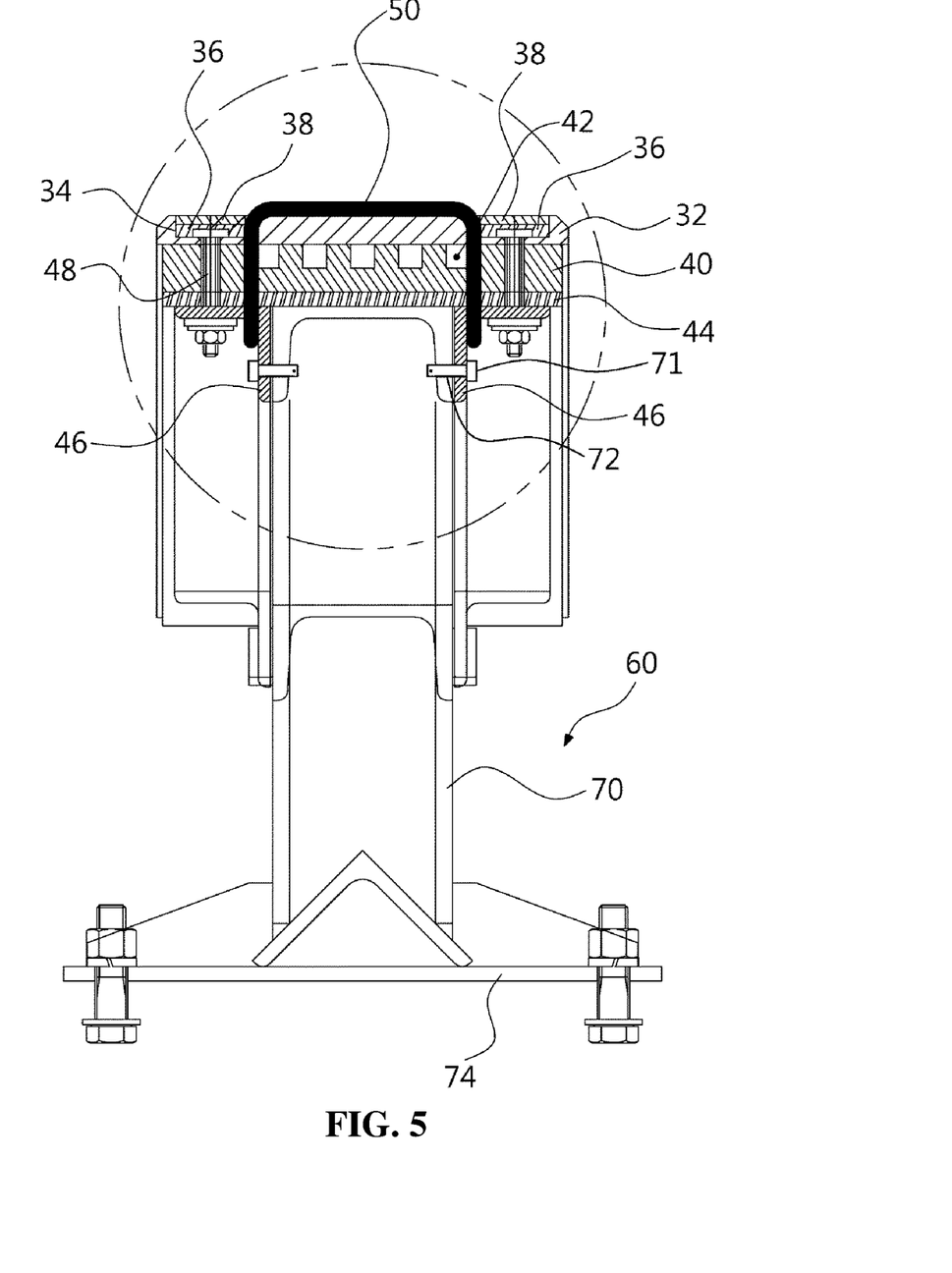
FIG. 5 is a side view showing the configurations of an impact bar means and an impact bar fastening means constituting the embodiment of the present invention.
Figure 6:
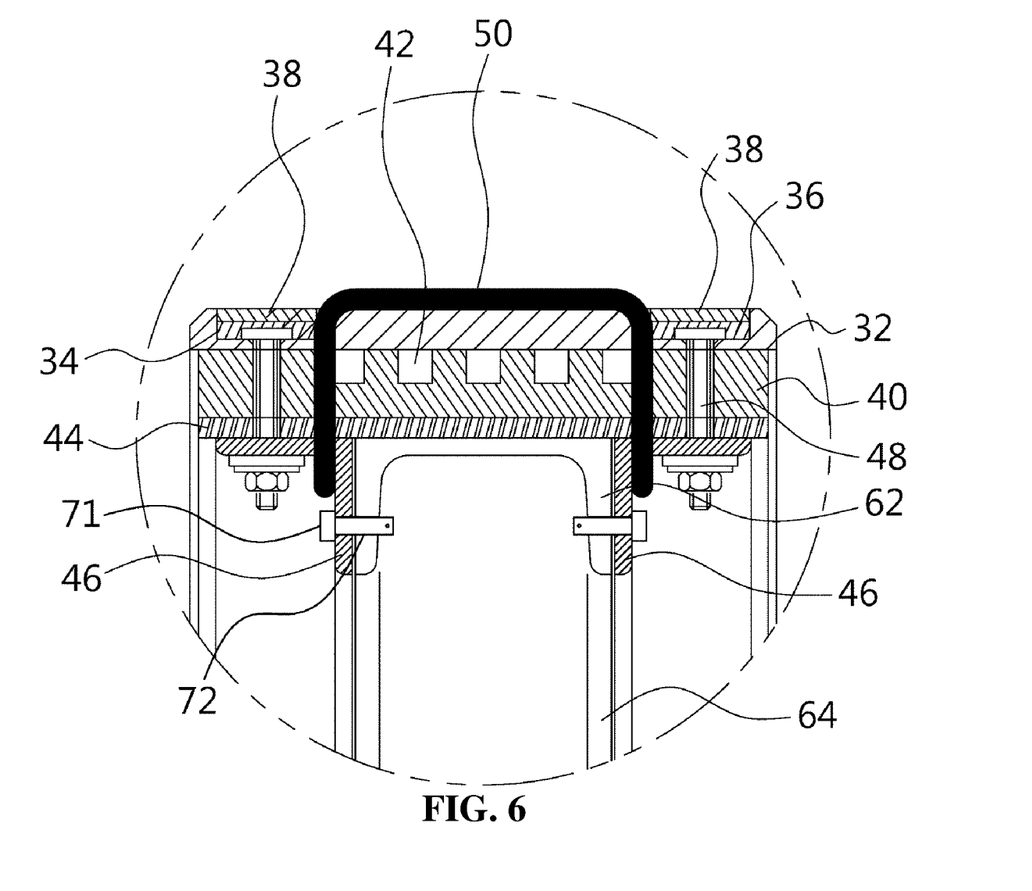
FIG. 6 is an enlarged view showing the configuration of the impact bar means constituting the embodiment of the present invention.
Figure 7:
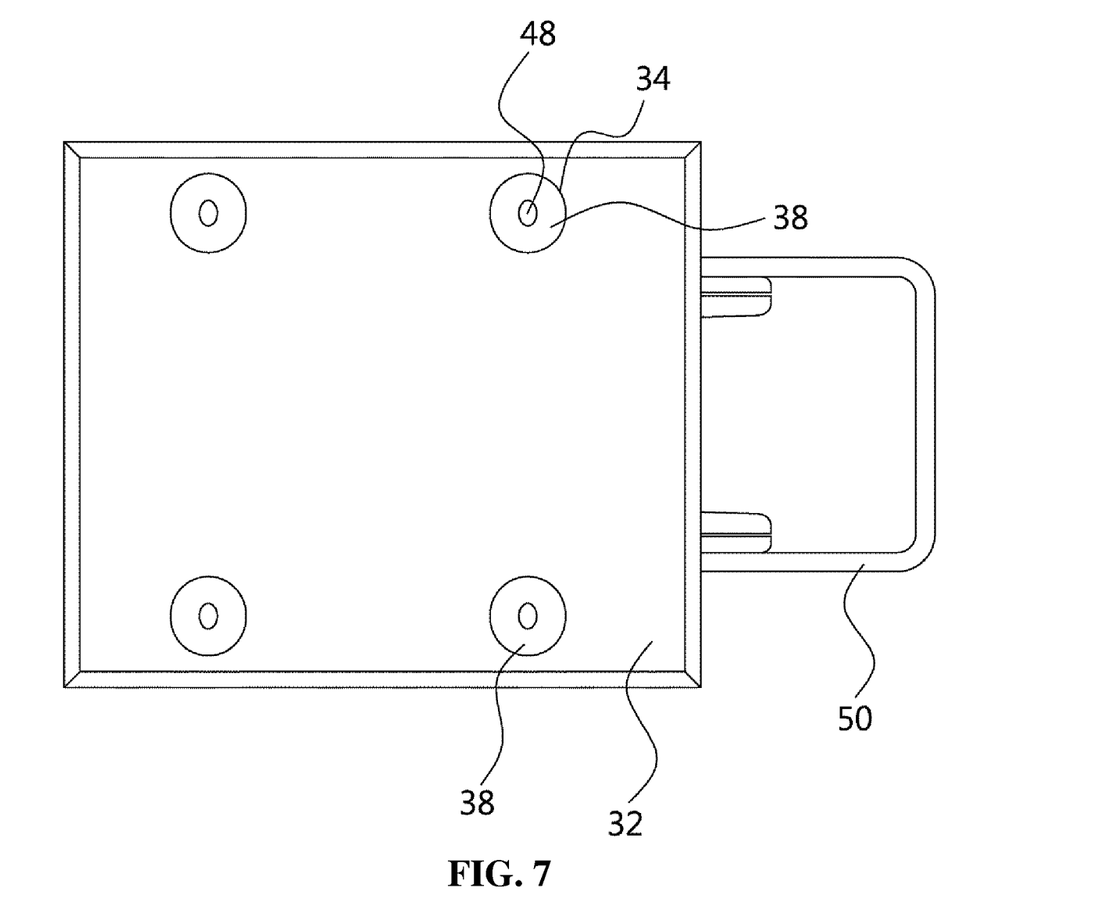
FIG. 7 is a plan view showing the configuration of the impact bar means constituting the embodiment of the present invention.
Figure 8:
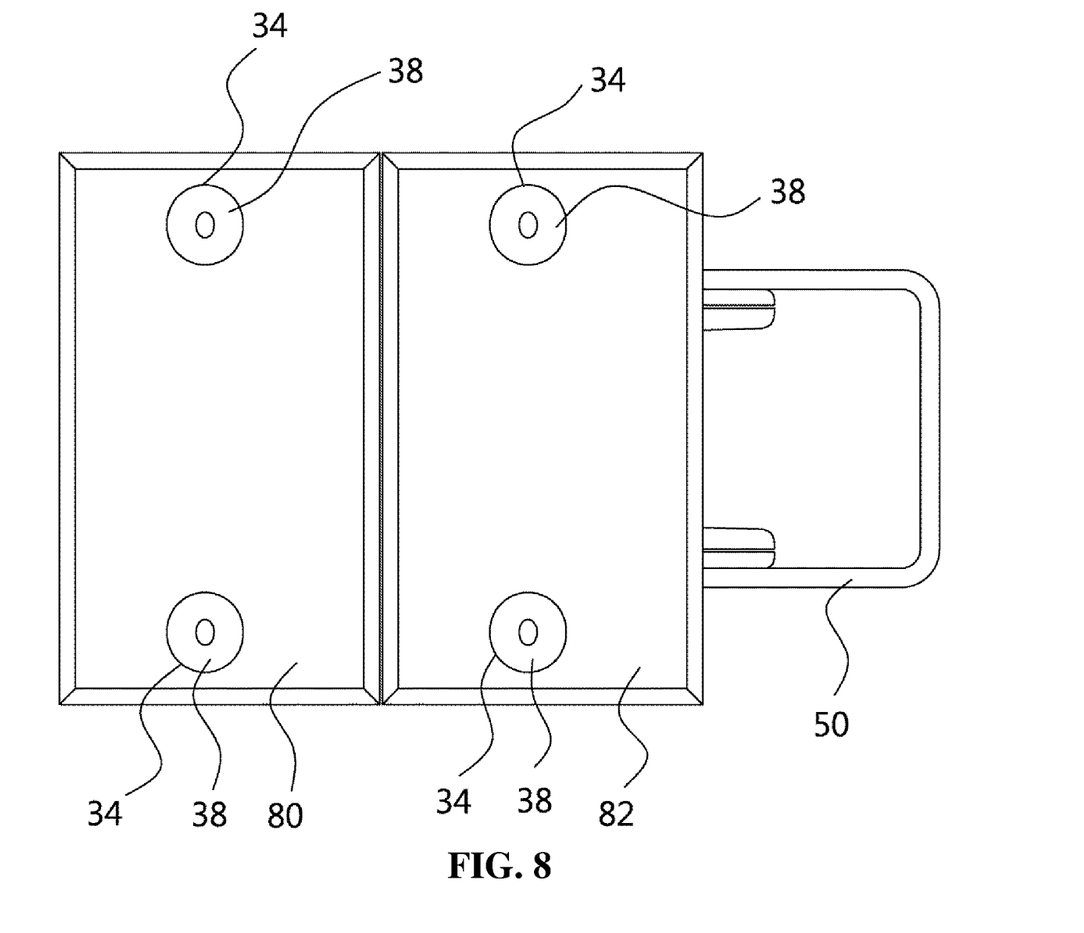
FIG. 8 is a plan view showing the configuration of an impact bar means constituting another embodiment of the present invention.

FIG. 2 shows a front sectional view showing the configuration of a preferred embodiment of a belt conveyor according to the present invention, FIG. 3 shows a plan view showing the configuration of the preferred embodiment of the belt conveyor according to the present invention, FIG. 4 shows a side view showing the configuration of the preferred embodiment of the belt conveyor according to the present invention, FIG. 5 shows a side view showing the configurations of an impact bar means and an impact bar fastening means constituting the embodiment of the present invention, FIG. 6 shows an enlarged view showing the configuration of the impact bar means constituting the embodiment of the present invention, FIG. 7 shows a plan view showing the configuration of the impact bar means constituting the embodiment of the present invention, and FIG. 8 shows a plan view showing the configuration of an impact bar means constituting another embodiment of the present invention.

As shown in these drawings, a belt conveyor according to the present invention includes: a belt B which is formed in a belt shape, which is supported, rotated and moved by a plurality of rollers 10, and which moves ore and a product seated on the top thereof in one direction; skirt means 12 which are installed along the longitudinal direction of the belt B, which are installed on both sides over the belt B, and which prevent the ore and the product from being scattered in the directions of both sides above the belt B when the ore and product seated on the belt B are transferred; impact bar means 30 which are installed beneath both sides of the belt B, and which rub against the belt B and also support the bottom surface of the belt B, thereby preventing the belt B from sagging, when the belt B is stopped and rotated and moved; and impact bar fastening means 60 which are installed beneath the impact bar means 30, and which support the lower ends of the impact bar means 30. The impact bar means 30 which are installed beneath both sides of the belt B are installed in transverse directions along the longitudinal direction of the belt B, and the impact bar means 30 which are installed over the impact bar fastening means 60 are detachably installed in left-right directions.

The belt B is a common belt, and a detailed description thereof will be omitted. The belt B is formed in a belt shape, is installed around the plurality of rollers 10, and functions to move ore or a product seated on the top surface thereof in one direction by the rotational driving of a driving device (not shown).

The plurality of rollers 10 is installed inside the belt B. The rollers 10 are common rollers, and a detailed description thereof will be omitted. The rollers 10 are installed inside the belt B at predetermined intervals, and function to rotate and move the belt B which has received the rotating force of the driving device.

The skirt means 12 are installed over the belt B. The skirt means 12 are installed on both sides above the belt B. Each of the skirt means 12 includes: a wearliner 14 which guides ore and a product moving along the top surface of the belt B toward the center of the belt B; a side plate 16 which is fastened to one side of the wearliner 14, and which supports the wearliner 14; a skirt 18 which is formed in a plate shape, which is fastened to one side of the side plate 16, and which prevents the ore and the product from being removed toward a corresponding one of both sides of the belt B in such a manner that a lower end thereof comes into close contact with the top surface of the belt B; and a skirt clamp 20 which is installed on one side of the skirt 18, and which selectively fastens and releases the fastening of the skirt 18.

The skirt means 12 are installed on both sides above the belt B, as shown in FIG. 2, and function to prevent ore and a product seated on the belt B from being separated toward the directions of both sides of the belt B during the transfer process of the belt B.

The impact bar means 30 are installed beneath the belt B. Each of the impact bar means 30 includes: an impact bar 32 which has a rectangular plate shape, which is made of an engineering plastic material, and which supports the bottom surface of the belt B; a wear check plate mounting groove 34 which is formed on a corresponding one of both sides over the impact bar 32, and which is depressed to a predetermined depth; a wear check plate 36 which is installed inside the wear check plate mounting groove 34, and which is formed in a color different from that of the impact bar 32 and, thus, is exposed to the outside and indicates the replacement time of the impact bar 32 when the impact bar 32 has been worn by a predetermined amount or more; a sliding plate 44 which is installed beneath the impact bar 32, which is composed of a plate having a predetermined thickness, and which supports the bottom of the impact bar 32; and sliding guide frames 46 which are installed on both sides of a bottom surface of the sliding plate 44, which are composed of steel frames having an inverted and reversed L-section shape, and which are installed along the bottom surface of the sliding plate 44 in a front-rear direction and guide sliding when the impact bar 32 is attached or detached.

The impact bar means 30 include a plurality of impact bar means which is installed at predetermined intervals below the belt B, as shown in FIG. 3, and function to prevent the belt B from sagging during the transfer process of the belt B and to support the lower end of the belt B.

The impact bars 32 are composed of rectangular plates having a predetermined thickness, and are made of an engineering plastic material. The material of the impact bars 32 has properties including considerably high impact resistance, high wear and abrasion resistance, and a significantly low friction coefficient, and thus has material properties suitable for the impact bars 32.

The impact bars 32 include a plurality of impact bars which are installed at predetermined intervals in transverse directions along the longitudinal direction of the belt B, as shown in FIG. 3. The impact bars 32 are installed beneath both sides of the belt B, and prevent the belt B from sagging.

The wear check plate mounting grooves 34 are formed through the top surfaces of the impact bars 32. As shown in FIGS. 3 to 6, the wear check plate mounting grooves 34 are depressed on both sides of the top surfaces of the impact bars 32 in cylindrical shapes. The insides of the wear check plate mounting grooves 34 are portions into which the wear check plates 36 to be described later are installed and fastened.

The wear check plates 36 are installed inside the wear check plate mounting grooves 34. The wear check plates 36 are formed in disk shapes, and are installed inside the wear check plate mounting grooves 34. The wear check plates 36 are formed in a color different from that of the impact bars 32, and function to be exposed to the outside and indicates the amount of wear of the impact bars 32 to the outside when the impact bars 32 are worn by a predetermined amount or more due to the friction with the belt B.

A fastening cap 38 is installed on the top of each of the wear check plates 36. The fastening cap 38 is made of the same material and formed in the same color as the impact bars 32, is formed in a disk shape, and is fastened and coupled to the top of the wear check plate 36.

In other words, the fastening cap 38 is installed on the top of the wear check plate 36, and functions to prevent the wear check plate 36 from being exposed to the outside and to securely fasten the wear check plate 36 to a corresponding one of the wear check plate mounting grooves 34.

A buffer member 40 is installed beneath each of the impact bars 32. The buffer member 40 is made of an elastic material, is composed of a rectangular plate, and elastically supports the bottom of the impact bar 32. The buffer member 40 is installed beneath the impact bar 32, and functions to absorb a shock when the belt B sags and thus applies the shock to the impact bar 32 because it is made of an elastic material.

A plurality of buffer grooves 42 is formed through the top surface of the buffer member 40. As shown in FIG. 6, the buffer grooves 42 are depressed through the top surface of the buffer member 40 at predetermined intervals in the longitudinal direction. The buffer grooves 42 function to form buffer spaces through the top surface of the buffer member 40 at predetermined intervals and to thus improve the buffering performance of the buffer member 40.

The sliding plate 44 is installed beneath the bottom surface of the buffer member 40. The sliding plate 44 is a common steel frame, and a detailed description thereof will be omitted. The sliding plate 44 is composed of a rectangular plate, and is installed beneath the buffer member 40. The sliding plate 44 functions to support the buffer member 40.

The sliding guide frames 46 are installed on both sides of the bottom surface of the sliding plate 44. The sliding guide frames 46 are composed of steel frames having an inverted and reversed "L"-section shape, as shown in FIGS. 5 and 6, and are installed in front-rear directions along the longitudinal direction of the sliding guide frames 46. The sliding guide frames 46 are spaced apart from each other by a predetermined interval on both sides of the bottom surface of the sliding plate 44, and function to come into close contact with both side surfaces of a sliding rail 62 and to guide the impact bar means 30 through attachment and detachment when the impact bar means 30 are mounted.

Fastening bolts 48 are installed through the insides of the wear check plate mounting grooves 34. The fastening bolts 48 are common bolts, and a detailed description thereof will be omitted. Each of the fastening bolts 48 is installed through the impact bar 32, the buffer member 40, and functions to fasten the sliding plate 44, the sliding guide frame 46, the impact bar 32, the buffer member 40, the sliding plate 44, and the sliding guide frame 46.

An attachment/detachment grip 50 is installed on one side of the sliding guide frames 46. The attachment/detachment grip 50 is a common grip, and a detailed description thereof will be omitted. The attachment/detachment grip 50 is fastened to the left or right side of the sliding guide frames 46, and allows a hand of an operator to grip it when the impact bar means 30 is attached or detached.

The impact bar fastening means 60 are installed beneath the impact bar means 30. Each of the impact bar fastening means 60 includes: a sliding rail 62 which has an inverted "U"-section shape, which is installed beneath the impact bar means 30, which is installed between the sliding guide frames 46, and which guides the impact bar fastening means 60 through sliding; a first support frame 64 which is fastened to one side of the sliding rail 62, and which supports one side of the sliding rail 62; and a second support frame 70 which is fastened to the other side of the sliding rail 62, and which supports the other side of the sliding rail 62.

The sliding rail 62 has an inverted "U"-section shape, as shown in FIG. 5, is composed of a steel frame, and is installed along the center of the bottom surface of the impact bar means 30 in a front-rear direction. The sliding rail 62 is installed between the sliding guide frames 46, and functions to guide the impact bar means 30 through attachment or detachment when the impact bar means 30 are attached or detached.

The first support frame 64 is installed at the left or right end of the sliding rail 62 (see FIG. 2). The first support frame 64 is composed of a steel frame having a sideways "U"-section shape, and includes a vertical frame 66 and a slant frame 68. The vertical frame 66 is composed of a steel frame having a predetermined height, and is vertically installed at the lower end of the right or left side of the impact bar means 30. The slant frame 68 which is inclined toward the impact bar means 30 is bent on the top of the vertical frame 66. The sliding rail 62 is fastened to an end of the slant frame 68, and the slant frame 68 functions to support one end of the sliding rail 62 at a predetermined inclined angle.

The second support frames 70 are installed at the left or right end of the sliding rail 62 (see FIG. 2). The second support frames 70 are common steel frames, and a detailed description thereof will be omitted. The second support frames 70 have a shorter length than the first support frame 64, and are vertically installed at both sides of a center portion below the belt B, respectively. The left or right end of the sliding rail 62 is coupled to an end of the second support frame 70, and the second support frame 70 functions to support one end of the sliding rail 62.

In other words, the sliding rail 62 is installed at a predetermined inclined angle in such a manner that the first support frame 64 is fastened to one end of the sliding rail 62 and the second support frame 70 is fastened to the other end of the sliding rail 62.

Fastening pins 71 are installed through the side surfaces of the sliding guide frames 46. The fastening pins 71 are common pins, and a detailed description thereof will be omitted. As shown in FIG. 6, the fastening pins 71 are inserted and fastened into the pin holes 72 of the sliding rail 62 and the sliding guide frames 46 when the sliding guide frames 46 are sliding-coupled to the sliding rail 62.

In other words, the fastening pins 71 are inserted and fastened into the sliding rail 62 and the sliding guide frames 46, and function to securely fasten the sliding guide frames 46 to the sliding rail 62.

A support base 74 is installed beneath the first and second support frames 64 and 70. The support base 74 is a common steel frame, and a detailed description thereof will be omitted. The support base 74 is installed beneath the first and second support frames 64 and 70 along a left-right direction, and supports the lower ends of the first and second support frames 64 and 70.

FIG. 8 shows another embodiment of an impact bar. As shown in FIG. 8, the impact bar 32 includes a first impact bar 80 and a second impact bar 82. The first and second impact bars 80 and 82 are composed of rectangular plates having a predetermined thickness, and are made of an ultra-high molecular weight polyethylene (UHMW) material. The material of the first and second impact bars 80 and 82, i.e., UHMW, has a molecular weight which is maximally 60 times higher than that of common polyethylene, is also called HMPE, and has material properties suitable for the first and second impact bars 80 and 82 because it has considerably high impact resistance, high wear and abrasion resistance, and a significantly low friction coefficient.

As shown in FIG. 8, the first and second impact bars 80 and 82 are installed on the left and right sides of the top surface of the buffer member 40. The first and second impact bars 80 and 82 are installed beneath the belt B, support the bottom of the belt B, and function to prevent the belt B from sagging.

In other words, the impact bar 32 includes the first and second impact bars 80 and 82. Accordingly, when the first impact bar 80 or second impact bar 82 is worn and damaged due to the friction with the belt B, it is possible to replace only the single rapidly worn impact bar without the need to replace all the two impact bars, thereby reducing unnecessary impact bar replacement cost.

Since the detailed structures of the first and second impact bars 80 and 82 are the same as the detailed configuration of the impact bar 32, a detailed description thereof will be omitted.

The operation of the belt conveyor according to the present invention, which has the above-described configuration, will be described with reference to FIGS. 1 to 8.

First, in order to install the impact bar means 30 beneath the belt B, an operator locates the impact bar means 30 over the impact bar fastening means 60 in the state of gripping the attachment/detachment grip 50 of the impact bar means 30.

The operator inserts the sliding rail 62 between the sliding guide frames 46 of the impact bar means 30, sliding-couples the impact bar means 30 in the transverse direction of the belt B, and then mounts the impact bar means 30 beneath the belt B by coupling the fastening pins 71.

The plurality of the impact bar means 30 is mounted beneath the belt B by repeating the above-described process of mounting the impact bar means 30, and then the operation of transferring ore and a product is performed by driving the belt conveyor.

In order to check the impact bars 32 during the transfer process of the belt conveyor, the operator removes the fastening pins 71, grips the attachment/detachment grip 50, and then pulls the impact bar means 30 in the transverse direction, thereby easily attaching and detaching the impact bar means 30.

Accordingly, the operator can easily detach only the impact bar means 30 and then check the impact bars 32 for their wear states during the operation of the belt conveyor, and thus an advantage arises in that the operation efficiency and assembly work efficiency of the belt conveyor are improved.

Furthermore, the impact bar means 30 are installed in the transverse directions based on the longitudinal direction of the belt B, and thus an effect arises in that this structure facilitates the checking and replacement of the impact bars located on the center side of the belt B compared to the conventional structure in which the impact bars are installed in vertical directions.

The wear check plates 36 are installed inside the impact bars 32. The wear check plates 36 are formed in a color different from that of the impact bars 32, and are exposed to the outside when the impact bars 32 are worn by a predetermined amount or more.

Accordingly, when an operator checks the impact bar means 30 and then observes the wear check plate 36 having a color different from that of the impact bars 32 by the naked eye, the impact bar 32 can be replaced, and thus advantages arise in that impact bar checking time is reduced and the efficiency of impact bar checking work is improved.

The scope of the present invention is not limited to the embodiments illustrated above, and those having ordinary skill in the art may make many modifications based on the present invention without departing from the above-described technical range.

The invention claimed is:

1. A belt conveyor comprising:
a belt which is formed in a belt shape, which is supported, rotated and moved by a plurality of rollers, and which moves ore and a product seated on a top thereof in one direction;
skirt means which are installed along a longitudinal direction of the belt, which are installed on both sides over the belt, and which prevent the ore and the product from being scattered in directions of both sides above the belt when the ore and product seated on the belt are transferred;
impact bar means which are installed beneath both sides of the belt, and which rub against the belt and also support a bottom surface of the belt, thereby preventing the belt from sagging, when the belt is stopped and rotated and moved; and
impact bar fastening means which are installed beneath the impact bar means, and which support lower ends of the impact bar means;
wherein the impact bar means which are installed beneath both sides of the belt are installed in transverse directions along the longitudinal direction of the belt, and the impact bar means which are installed over the impact bar fastening means are detachably installed in left-right directions, and
wherein each of the impact bar means comprises:
an impact bar which has a rectangular plate shape, which is made of an engineering plastic material, and which supports a bottom surface of the belt;
a wear check plate mounting groove which is formed on a corresponding one of both sides over the impact bar, and which is depressed to a predetermined depth;
a wear check plate which is installed inside the wear check plate mounting groove, and which is formed in a color different from that of the impact bar and, thus, is exposed to an outside and indicates replacement time of the impact bar when the impact bar has been worn by a predetermined amount or more;
a sliding plate which is installed beneath the impact bar, which is composed of a plate having a predetermined thickness, and which supports a bottom of the impact bar; and
a sliding guide frame which is installed on a corresponding one of both sides of a bottom surface of the sliding plate, which includes a steel frame having an inverted and reversed L-section shape, and which is installed along the bottom surface of the sliding plate in a front-rear direction and guides sliding when the impact bar is attached or detached.

2. The belt conveyor of claim 1, wherein an attachment/detachment grip which is formed in a grip shape, which is fastened to the sliding plate and which allows a hand of an operator to grip it when the impact bar means is attached or detached is further provided on one side of the impact bar means.

3. The belt conveyor of claim 1, wherein:
a buffer member which is made of an elastic material and which elastically supports each of the impact bars is further provided beneath the impact bar; and
buffer grooves which are depressed at predetermined intervals along a longitudinal direction and which increase elastic force upon supporting a bottom surface of the impact bar are further provided on a top surface of the buffer member.

4. A belt conveyor comprising:
a belt which is formed in a belt shape, which is supported, rotated and moved by a plurality of rollers, and which moves ore and a product seated on a top thereof in one direction;
skirt means which are installed along a longitudinal direction of the belt, which are installed on both sides over the belt, and which prevent the ore and the product from being scattered in directions of both sides above the belt when the ore and product seated on the belt are transferred;
impact bar means which are installed beneath both sides of the belt, and which rub against the belt and also support a bottom surface of the belt, thereby preventing the belt from sagging, when the belt is stopped and rotated and moved; and
impact bar fastening means which are installed beneath the impact bar means, and which support lower ends of the impact bar means;
wherein the impact bar means which are installed beneath both sides of the belt are installed in transverse directions along the longitudinal direction of the belt, and the impact bar means which are installed over the impact bar fastening means are detachably installed in left-right directions,
wherein each of the impact bar fastening means comprises:
a sliding rail which has an inverted "U"-section shape, which is installed beneath the impact bar means, which is installed between sliding guide frames, and which guides the impact bar fastening means through sliding;
a first support frame which is fastened to one side of the sliding rail, and which supports one side of the sliding rail; and
a second support frame which is fastened to a remaining side of the sliding rail, and which supports a remaining side of the sliding rail.

* * * * *